(12) United States Patent
Bari et al.

(10) Patent No.: US 10,248,729 B2
(45) Date of Patent: Apr. 2, 2019

(54) METHOD AND SYSTEM OF QUANTIFYING AND QUALIFYING ATHLETIC SKILLS AND COMPETITIVE RESULTS IN A SOCIAL NETWORK

(71) Applicant: Bari Enterprises, Inc., Philadelphia, PA (US)

(72) Inventors: Jonathan H. Bari, Penn Valley, PA (US); Leslie S. Bari, Penn Valley, PA (US); Abhijeeth Ramesh, Marietta, GA (US)

(73) Assignee: Bari Enterprises, Inc., Philadelphia, PA (US)

( * ) Notice: Subject to any disclaimer, the term of this patent is extended or adjusted under 35 U.S.C. 154(b) by 591 days.

(21) Appl. No.: 14/721,982

(22) Filed: May 26, 2015

(65) Prior Publication Data

US 2015/0347598 A1    Dec. 3, 2015

Related U.S. Application Data

(60) Provisional application No. 62/003,924, filed on May 28, 2014.

(51) Int. Cl.
*G06F 17/30* (2006.01)
*G06Q 50/00* (2012.01)

(52) U.S. Cl.
CPC .... *G06F 17/30867* (2013.01); *G06F 17/3053* (2013.01); *G06F 17/3087* (2013.01); *G06Q 50/01* (2013.01)

(58) Field of Classification Search
CPC .............. G06Q 50/01; G06F 17/30867; G06F 17/3053

USPC ....... 709/204, 206, 219, 203, 218, 224, 201, 709/213, 217, 223, 226, 231; 705/27.1, 705/39, 14.53, 14.73, 26.5, 26.7, 317, 705/319, 347, 44, 13, 14.23, 14.4, 14.58, 705/14.66, 14.69, 21, 26.1, 26.2, 26.35, 705/26.62, 27.2, 3, 321, 328, 329, 7.33; 707/748, 758, 722, 723, E17.005, 707/E17.018, E17.033, E17.045, E17.082, (Continued)

(56) References Cited

U.S. PATENT DOCUMENTS

| | | |
|---|---|---|
| 6,978,246 B1 | 12/2005 | Ruvolo et al. |
| 6,996,444 B2 | 2/2006 | Ach, III |
| 7,050,868 B1 | 5/2006 | Graepel et al. |

(Continued)

*Primary Examiner* — Jay A Morrison
*Assistant Examiner* — Ken Hoang
(74) *Attorney, Agent, or Firm* — Morgan, Lewis & Bockius LLP

(57) ABSTRACT

A method of quantifying and qualifying athletic skills and competitive data in a social network implemented on a client computing device having one or more processors and memory for storing one or more programs to be executed by the processors comprising registering a first user with the social network and creating a first user account; establishing a user profile for the first user; searching at least one remote database for at least one of skills, ratings and competition data relating to the first user, and if found, retrieving the at least one of skills data, ratings data and competition data and adding the data to the first user account in a social network database; displaying predetermined information from the first user account on the client computing device; and creating a connection list for the first user that comprises at least one other user.

18 Claims, 22 Drawing Sheets

(58) Field of Classification Search
USPC ........ 707/E17.089, 609, 707, 734, 736, 737, 707/740, 741, 769, 802
See application file for complete search history.

(56) References Cited

U.S. PATENT DOCUMENTS

| | | |
|---|---|---|
| 7,069,308 B2 | 6/2006 | Abrams |
| 7,188,153 B2 | 3/2007 | Lunt et al. |
| 7,246,066 B2 | 7/2007 | Black |
| 7,376,474 B2 | 5/2008 | Graepel et al. |
| 7,813,821 B1 | 10/2010 | Howell |
| 7,846,024 B2 | 12/2010 | Graepel et al. |
| 8,010,460 B2 | 8/2011 | Work et al. |
| 8,239,364 B2 | 8/2012 | Wable et al. |
| 8,335,798 B2 | 12/2012 | Achlioptas |
| 8,346,866 B2 | 1/2013 | Canning et al. |
| 8,386,340 B1 | 2/2013 | Feinstein |
| 8,516,031 B2 | 8/2013 | Eschenauer et al. |
| 8,538,910 B2 | 9/2013 | Minka et al. |
| 8,539,359 B2 | 9/2013 | Rapaport et al. |
| 8,548,610 B1 | 10/2013 | Howell et al. |
| 8,601,055 B2 | 12/2013 | Smith et al. |
| 8,606,021 B2 | 12/2013 | Conwell |
| 8,606,784 B2 | 12/2013 | Snyder |
| 8,639,764 B2 | 1/2014 | Rao |
| 8,649,890 B2 | 2/2014 | Martin |
| 8,682,971 B2 | 3/2014 | Farrell et al. |
| 8,694,593 B1 | 4/2014 | Wren et al. |
| 8,700,619 B2 | 4/2014 | Wiegering et al. |
| 2001/0034734 A1 | 10/2001 | Whitley et al. |
| 2002/0016791 A1 | 2/2002 | Palmer |
| 2005/0209717 A1 | 9/2005 | Flint et al. |
| 2006/0247060 A1 | 11/2006 | Hanson et al. |
| 2007/0060328 A1 | 3/2007 | Zrike et al. |
| 2008/0005231 A1 | 1/2008 | Kelley et al. |
| 2008/0010343 A1 | 1/2008 | Escaffi et al. |
| 2008/0147422 A1* | 6/2008 | Van Buskirk .......... G06Q 10/10 705/7.12 |
| 2008/0222535 A1 | 9/2008 | Zrike et al. |
| 2008/0300905 A1 | 12/2008 | Kelley, III |
| 2009/0125230 A1 | 5/2009 | Sullivan |
| 2009/0187473 A1 | 7/2009 | Blaze et al. |
| 2009/0307234 A1 | 12/2009 | Zrike et al. |
| 2011/0066664 A1 | 3/2011 | Goldman et al. |
| 2011/0320375 A1 | 12/2011 | Zrike et al. |
| 2012/0095578 A1* | 4/2012 | Tchao ................ G06F 19/3418 700/91 |
| 2013/0212033 A1 | 8/2013 | Work et al. |
| 2013/0290202 A1 | 10/2013 | Nunnery et al. |
| 2013/0290420 A1 | 10/2013 | Work et al. |
| 2013/0290448 A1 | 10/2013 | Work et al. |
| 2014/0101277 A1 | 4/2014 | Rao |
| 2014/0108547 A1 | 4/2014 | Rao |
| 2014/0274404 A1* | 9/2014 | Hoskins ................ A63F 13/795 463/42 |

* cited by examiner

| Logo/Image | Email | Password | Sign In |

Forgot Password

Create a social network of your
tennis friends and their friends

Sign Up:
Player First Name          Player Last Name

🎾 Maintain your historical match play records
Player USTA #              Email

🎾 See photos, tournament results and updates

🎾 Share your tennis news
Password                   Confirm your Password

🎾 Find a hitting partner

🎾 Schedule a practice match
*By clicking to sign up, you confirm that you are at least 13 years of age
and agree to our Terms & Conditions and Privacy Policy 🎾 Develop technical competencies Sign Up Privacy Policy Advertisement(s)

FIG. 2A

| User Registration & Profile 200 |||||
|---|---|---|---|---|
| First Name 201 | | Last Name 202 || Profile Photo 207 |
| Gender 203 | Email Address 204 | Password 205 ||  |
| | | Password Reentry 206 ||  |
| Street # 208 | Street Address 209 ||| |
| City 210 | | State 211 | Zip Code 212 | |
| Organizational Membership # 213 || USTA Section 214 | USTA District 215 ||
| Rating 216 | Birthday 217 | School 218 | Grade Level 219 ||
| College Preferences 220 |||||
| Organizational Networks 221 |||||
| Training Facility/Club/Center 222 |||||
| Organizational Clubs 223 |||||
| Coaches 224 |||||
| Sponsorship 225 ||| Favorite Players 226 ||
| ||| Player Preferences 227 ||
| ||| Handed ▼ — 228 ||
| Player Contact Information 229 |||||
| Parent Contact Information 230 |||||
| • • • |||||

FIG. 2B

| Records by Opponent 500 | |
|---|---|
| Sort by Date 501 | |
| Sort by Tournament 502 | Advertisement(s) |
| Sort by Opponent 503 | |

Player 1 vs. Player A 504

| Player 1 | ✓ | 6 | 5 | 6 | | |
|---|---|---|---|---|---|---|
| Player A | | 1 | 7 | 3 | | |

505

| Tournament Name (Link) 506 | Tournament ID # 507 |
|---|---|
| Tournament Level 508 | Round 509 |
| Result/Code 510 | Draw 511 |

Player 1 vs. Player A 512

| Player 1 | | 3 | 6 | 3 | | |
|---|---|---|---|---|---|---|
| Player A | ✓ | 6 | 1 | 6 | | |

513

| Tournament Name (Link) 513A | Tournament ID # 514 |
|---|---|
| Tournament Level 515 | Round 516 |
| Result/Code 517 | Draw 518 |

FIG. 5A

Records by Opponent (continued)

Player 1 vs. Player B 519

| Player 1 | ✓ | 6 | 5 | 6 | | |
|---|---|---|---|---|---|---|
| Player B | | 1 | 7 | 3 | | |

520

Advertisement(s)

| Tournament Name (Link) 521 | Tournament ID # 522 |
|---|---|
| Tournament Level 523 | Round 524 |
| Result/Code 525 | Draw 526 |

Player 1 vs. Player C 527

| Player 1 | | 3 | 6 | 3 | | |
|---|---|---|---|---|---|---|
| Player C | ✓ | 6 | 1 | 6 | | |

528

| Tournament Name (Link) 529 | Tournament ID # 530 |
|---|---|
| Tournament Level 531 | Round 532 |
| Result/Code 533 | Draw 534 |

FIG. 5B

| Records by Opponent (continued) | | | | | | | |
|---|---|---|---|---|---|---|---|
| Player 1 vs. Player C 535 | | | | | | | |
| Player 1 | ✓ | 6 | 5 | 6 | | | 536 |
| Player C | | 1 | 7 | 3 | | | |

| | |
|---|---|
| Tournament Name (Link) 537 | Tournament ID # 538 |
| Tournament Level 539 | Round 540 |
| Result/Code 541 | Draw 541A |

| Player 1 vs. Player C 542 | | | | | | | |
|---|---|---|---|---|---|---|---|
| Player 1 | | 3 | 6 | 3 | | | 543 |
| Player C | ✓ | 6 | 1 | 6 | | | |

| | |
|---|---|
| Tournament Name (Link) 544 | Tournament ID # 545 |
| Tournament Level 546 | Round 547 |
| Result/Code 547A | Draw 549 |

Advertisement(s)

FIG. 5C

| Records by Opponent (continued) | | | | | | | |
|---|---|---|---|---|---|---|---|
| Player 1 vs. Player D 550 | | | | | | | |
| Player 1 | V | 6 | 5 | 6 | | | 551 |
| Player D | | 1 | 7 | 3 | | | |

| | |
|---|---|
| Tournament Name (Link) 552 | Tournament ID # 553 |
| Tournament Level 554 | Round 555 |
| Result/Code 556 | Draw 557 |

| Player 1 vs. Player D 558 | | | | | | | |
|---|---|---|---|---|---|---|---|
| Player 1 | | 3 | 6 | 3 | | | 559 |
| Player D | V | 6 | 1 | 6 | | | |

| | |
|---|---|
| Tournament Name (Link) 560 | Tournament ID # 561 |
| Tournament Level 562 | Round 563 |
| Result/Code 564 | Draw 565 |

Advertisement(s)

FIG. 5D

Records by Date

| | |
|---|---|
| Sort by Date | 556 |
| Sort by Tournament | 557 |
| Sort by Opponent | 558 |
| Sort by Scores | 559 |
| Sort by Age Groups | 560 |
| Sort by Level | 561 |

Player Record — 562

| Player's Name 563 | Date Range 564 | Overall Record 565 | Residence 566 |
|---|---|---|---|
| Smith, Jane | August 1 2012-September 22, 2014 | 21 – 15 | Philadelphia, PA |

567

Cynwyd Back to School Open (DR –L7) – 360004314 (G12s)  08/29/2014

| Round | Result | Opponent | Score |
|---|---|---|---|
| 16 | Loss | Jenny Dole | 6-3, 6-2 |

568

Camp Vega Girls 12, 14, 16L7 Futures Circuit Event – 450029814 (G12s)  07/16/2014

| Round | Result | Opponent | Score |
|---|---|---|---|
| R1 | Loss | Tammy Hancock | 6-1 |
| R2 | Win | Amy Orthega | 4-0 |
| R3 | Win | Sally Smith | 6-1 |

569

Delaware State Junior 10 & Under (DR-L8) – 3600031314 (G10s)  06/19/2014

| Round | Result | Opponent | Score |
|---|---|---|---|
| 32 | Win | Haley Berry | 6-0, 6-0 |
| 16 | Win | Megan Manning | 6-2, 6-3 |
| Q | Win | Becky Zhou | 6-4, 6-1 |
| S | Win | Idriss Mims | 7-5, 6-2 |
| F | Win | Chalu Beggis | 3-6, 6-3, 7-5 |

570

Chirico Cohen Tennis Academy Girls June Invitational (DR-LT) 350050714(G12s) 06/13/2014

| Round | Result | Opponent | Score |
|---|---|---|---|
| 16 | Win | Tiffany Zongh | 6-4, 7-6 |
| Q | Loss | Debbie Elm | 6-3, 6-0 |

. . .

Advertisement(s)

FIG. 5E

| Name of the searched Player A 600 | | |
|---|---|---|
| Photo of Player A 601 | Records and Ranking 602<br>Section: ---<br>District: ---<br>Club: ---<br>Rank: ---<br>Rating: ---<br>Records: --- | Profile 603<br><br>Connection Status 604<br><br>Degrees of Separation 605<br><br>Connection Request 606<br><br>Data Sort by Range 607<br><br>Data Sort by Ranking 608 |

| Player A vs. You 609 | Wins Losses |
|---|---|
| 2013: 9 – 3 | |
| 2012: 7 – 5 | 0 - 5 |
| ⋮ | |

| Player A vs. Your Friends 610 | Wins Losses |
|---|---|
| Your Friend 1 | |
| 2013: 42 – 9 | |
| 2012: 54 – 13 | 7 - 2 |
| Your Friend 2 | |
| 2013: 35 – 12 | |
| 2012: 52 – 14 | 1 - 8 |

| Player A vs. People You have Played 611 | Wins Losses |
|---|---|
| Player B | |
| 2013: 50 – 5 | |
| 2012: 53 – 7 | 3 - 5 |

Advertisement(s)

FIG. 6A

| Player Ranking | Search Again | 611 | | |
|---|---|---|---|---|
| *612* Player Name | *613* District | *614* Section | | *615* Select Period |
| Smith, Jane | Philadelphia | Middle States | | All |

| *616* List Name | *617* Calculation Date | *618* Rank Position |
|---|---|---|
| Girls 12's PPR Philadelphia District Ranking | 08/11/2014 | 1 |
| Girls 12 Singles + 25% of Doubles (Combined) | 08/09/2014 | 2 |
| Girls 12's Combined Standings List (Combined) | 11/11/2014 | 2 |
| Girls 12, Singles, Middle States | 11/01/2014 | 5 |
| Girls 12, Singles, National | 11/01/2014 | 282 |
| Girls 12, International | 11.01.2014 | 513 |
| . | . | . |
| . | . | . |
| . | . | . |

Advertisement(s)

FIG. 6B

Girls 12's PPR Philadelphia District Ranking ~619
Published 8/8/2014 at 3:55 AM. The list includes single players Show [Eligible Players ▼]   Filter By ⦿ Rank  ○ Name  ○ District  ○ Section  [Choose Date Range ▼]
        `-621                        `-622                                    `-623

~620 Girls' 12 Singles

| Rank | Name | City | State | Section | District | Points |
|---|---|---|---|---|---|---|
| 1 | Jane Smith | Souderson | PA | Middle States | Philadelphia | 400 |
| 2 | Jean Perlran | Wayne | PA | Middle States | Philadelphia | 380 |
| 3 | Carolyn Oventry | Easton | PA | Middle States | Philadelphia | 260 |
| 4 | • | • | • | • | • | • |
| 5 | • | • | • | • | • | • |
| 6 | • | • | • | • | • | • |
| 7 | | | | | | |
| 8 | | | | | | |
| 9 | | | | | | |
| 10 | | | | | | |
| 17 | | | | | | |
| 18 | | | | | | |
| 19 | | | | | | |
| • | | | | | | |
| • | | | | | | |
| • | | | | | | |
| 50 | | | | | | |
| • | | | | | | |
| • | | | | | | |
| • | | | | | | |

Advertisement(s)

FIG. 6C

Group(s)

Player A's Group(s)   700

Create a Group   701       Search for a Group   702

Groups You Have Created   703   Groups You Have Joined   704

Logo/Image
705

| Name | 706 |
| Photo(s) | 707 |
| Video(s) | 708 |
| Description | 709 |
| Administrator | 710 |
| Number of Members | 711 |
| Private/Public | 712 |
| Click to Join | 713 |

Advertisement(s)

FIG. 7

METHOD AND SYSTEM OF QUANTIFYING AND QUALIFYING ATHLETIC SKILLS AND COMPETITIVE RESULTS IN A SOCIAL NETWORK

FIELD OF THE INVENTION

The present invention relates to the technical field of a social network application implemented on a client computing device, and in particular, relates to a method and system of quantifying and qualifying athletic skills and competitive results in a social network that includes athletes, fans, and others who may be interested in the athletes and the sport(s).

BACKGROUND OF THE INVENTION

In recent years, social networking applications have become increasingly popular. A social networking application provides its users with a public platform on which the users may create personal profiles, establish personal connections and networking, message/communicate with other users, publish announcements, share information with the public or within a defined group of users and learn information about their connections. For example, LinkedIn is a business-oriented social networking service. LinkedIn enables its users, including employers and people who seek employment, to create profiles and connections to each other in an online social network which may represent real-world professional, educational and organizational relationships. Meanwhile, Facebook, although started as a college students' social networking service, now provides its social networking service to hundreds of millions of users worldwide.

In the athletic and sports fields, various organizational websites including national athletic governing bodies, schools, and leagues, for example, may provide publicly available data for professional athletes and non-professional athletes, including juniors (children) and adults. For example, the United States Tennis Association ("USTA") is the not-for-profit national governing body for the sport of tennis in the United States, and collects, hosts and publishes tennis news, scores, records, rankings, information on tennis leagues, tennis tournaments, and related links. While the USTA and other national governing bodies and organizations provide various websites with data on competitions, including competition data with rankings and records, most data appear as static files that may be updated on a regular basis, i.e., daily, weekly, monthly, quarterly, annually, etc. There are little to no real-time updates, little to no notifications or push notifications, and no multi-directional/degree relationships between the players. Further, while there is a good amount of USTA data available online, the data is often parsed into and presented as separate silos of information, the data is static, and the data is one dimensional. For example, a player's records and a player's rankings are not readily available together at a glance, and one needs to toggle back forth between different browser screens and search queries, or leave a player's rankings and then perform a new search to view the player's records, or vice versa. Thus, the data that is available publicly may present information as just a subset of available data, and may not necessarily include complete histories over time or across various geographical districts/sections and/or demographic categories. Moreover, the data that is available through the USTA is one dimensional since it only relates primarily to one player and not to multiple players through a social graph. What is available now, especially for amateur athletes, is rather rudimentary and typically limited by recall of a player's or parent's memory, word of mouth and incomplete online information. As the number of competitions that a player competes in increases, the volume of competition data increases as does the interactions and interconnections between the athletes.

There exists a need for the athletes, and/or their coaches and parents, or anyone interested in the particular sport to create their own social graph (sport graph) that contains various interconnections to other athletes, and progress timelines for the athletes that enables users to access data, including records, rankings, skills, competencies, ratings, etc. in one location.

The present invention provides the athletes, parents, friends, coaches, fans, and anyone else who is interested in the athletes and the sport(s) an online platform to create a social (sport) graph between the athletes and friends, and to help connect athletes, athlete's parents and the coaches. In addition to the publicly available data from various competition data sources, the present invention enables the users to create personalized records of each competition, and presents to users aggregated records and rankings over a time period and across various divisions, demographic groups, as well as geographic areas/sections. Further, the present invention can retrieve the records and rankings of an athlete from a remote database, store the competition data on the social network's database, and display the records and rankings data over a time period and across various divisions, demographic groups, as well as geographic districts/sections on a client computing device. Further, the present invention allows athletes or other authorized parties to manually input competition data including match play records, tournament results, etc. to augment the competition data in the system's database. Further, the present invention creates interrelationships between athletes by showing results, including win-loss records, scores, and degrees of separation (e.g., first, second, third, fourth degrees etc.) between athletes, thus facilitating the users to gather more information on the skills and competitive levels of the opponents and potential opponents relative to the athletes in their network or extended networks. Further, the present invention enables the users to sort competition data by athletes and opponents to show interconnections and degrees of separation between athletes, opponents and potential opponents. The present invention may further allow athletes, friends, parents and coaches to create their own social (sports) graph about interconnections to other athletes, through friendship and/or competition, and progress timelines for skills and athletic results of the athletes.

The sport of tennis is used herein for illustration only. The invention is not limited to the sport of tennis, however, but includes all sports, both individual and team sports. Moreover, the embodiments are not limited to sports, but are equally useful for any competitive community (i.e., chess, video games, spelling bees) of users.

SUMMARY

In accordance with some embodiments, a method of quantifying and qualifying athletic skills and competitive data in a social network implemented on a client computing device having one or more processors and memory for storing one or more programs to be executed by the processors comprising registering a first user with the social network and creating a first user account; establishing a user profile for the first user; searching at least one remote database for at least one of skills data, ratings data and competition data relating to the first user, and if found, retrieving the at least one of skills data, ratings data and competition data and adding the data to the first user account in a social network database; displaying predetermined information from the first user account on the client computing device; and creating a connection list for the first user that comprises at least one other user.

In accordance with some embodiments, a method of quantifying and qualifying athletic skills and competitive data in a social network comprises a connection list that is created by at least one of: the first user directly sending a connection request to at least one other user and receiving an acceptance from the at least one other user; the first user searching the social network database and sending a connection request to at least one other user found in the search results and receiving an acceptance from the at least one other user; the first user searching the at least one remote database and sending a connection request to at least one other user found in the search of the remote database and receiving an acceptance from the at least one other user; the first user accepting a connection request from at least one other user; and the first user directly competing against at least one other user.

In accordance with some embodiments, a method of quantifying and qualifying athletic skills and competitive data in a social network comprises updating at least one of the skills data, ratings data and competition data of the first user after the first user completes a competition or training for which there is updated skills, ratings and/or competition data available in at least one remote database.

In accordance with some embodiments, a method of quantifying and qualifying athletic skills and competition data in a social network wherein searching at least one remote database for at least one of skills data, ratings data and competition data relating to the first user, and if found, retrieving the at least one skills data, ratings data and competition data and adding the data to the first user account is performed by the first user.

In accordance with some embodiments, a method of quantifying and qualifying athletic skills and competitive data in a social network comprises calculating a number of users through whom the first user connects to another user; and determining a separation degree of the another user based on the calculated number of users, wherein if there are n users through whom the first user connects to the another user, the separation degree of the another user is determined as n+1.

In accordance with some embodiments, a method of quantifying and qualifying athletic skills and competitive data in a social network comprises retrieving at least one of skills data, ratings data and competition data of the another user from the at least one remote database; displaying the skills data, ratings data and competition data, and the separation degree between the user and the another user on the client computing device; and if the separation degree between the user and the another user is 1, displaying predetermined information from the another user account or the remote database and a connection starting date on the client computing device, wherein the predetermined information from the another user comprises at least one of: a summary of competition data of the another user over a pre-defined time period; and competition data over a pre-defined time period of the another user against each opponent.

In accordance with some embodiments, a method of quantifying and qualifying athletic skills and competitive data in a social network comprises creating a plurality of groups from the connection list of the first user based on attributes defined by the first user.

In accordance with some embodiments, a method of quantifying and qualifying athletic skills and competitive data in a social network, further comprises creating at least one group to aggregate users into a group wherein the group administrator and/or group members can analyze skills, ratings and/or competition data of group members in relation to one another with respect to the members of a particular cohort or group.

In accordance with some embodiments, a method of quantifying and qualifying athletic skills and competitive data in a social network further comprises retrieving at least one of skills, ratings and competition data of the first user from at least one of skills, ratings and competition data source, and aggregating the at least one of skills, ratings and competition data of the first user from the at least one remote competition data source and storing in the first user account in the social network database.

In accordance with some embodiments, a method of quantifying and qualifying athletic skills and competitive data in a social network has a user profile of the first user that comprises at least one of: a photo of the first user; personal information of the first user including a unique personally identifying data; athletic information of the first user including an organizational ID number; contact information; date of birth; sport(s) played; college recruiting data; coaches of the first user; academic schools attended; tennis camps attended; tennis facilities where user trains; teams competed on/doubles partners; sponsorships of the first user; and parent information of the first user.

In accordance with some embodiments, a method of quantifying and qualifying athletic skills and competitive data in a social network includes at least one of the skills data, ratings data and competition data of the first user being retrieved by the system using the unique personally identifiable data of the first user, and storing same in the system database.

In accordance with some embodiments, a method of quantifying and qualifying athletic skills and competitive data in a social network comprises at least one of the skills data, ratings data and competition data of the first user that may include a plurality of rankings and records data across various divisions, demographic groups and/or geographic areas.

In accordance with some embodiments, a method of quantifying and qualifying athletic skills and competitive data in a social network, wherein the at least one of skills data, ratings data and competition data of the first user comprises a competition summary data of the first user over a pre-defined time period; competition data, including win(s)-loss(es) and scores for each competition of the first user against each opponent user; and date and location of each competition.

In accordance with some embodiments, a system of quantifying and qualifying athletic skills and competitive data in a social network comprises a client computing device having one or more processors; memory for storing one or more programs to be executed by the processors; a profile managing module configured to establish and maintain a user profile for a first user in at least one database; a search module configured to search the system's database for skills data, ratings data and competition data relating to the first user, other users, opponents and/or potential opponents; a communication module configured to send/receive messages to/from another user; a connections managing module configured to send/receive connection requests to/from another user; a graph managing module configured to manage a connection list of the first user, the interconnections between users, opponents and potential opponents, and add other users, opponents and potential opponents into the connection list upon approval; a retrieving module configured to retrieve skills, ratings and competition data of the first user from the at least one remote database; a display module configured to display the at least one of skills and competition data of the first user on the client computing device; an input module configured to input competition data, including win(s)-loss(es) and scores for a competition of the first user against an opponent and/or another user; a transmitting module configured to transmit the competition data, including win(s)-loss(es) and scores of the first user from the remote database to update at least one of athletic skills, ratings and competition data of the first user in the profile managing module; and an updates module configured to update the at least one of athletic skills data, ratings data and competition data from at least one remote database on a regular interval and at time of login to the system.

In accordance with some embodiments, a system of quantifying and qualifying athletic skills and competitive data in a social network, further comprises a tier managing module configured to calculate a number of users through whom the first user connects to another, and determine a separation degree of the another user based on the calculated number of users, wherein if there are n users through whom the first user connects to the another user, the separation degree of the another is determined as n+1.

In accordance with some embodiments, a system of quantifying and qualifying athletic skills and competitive data in a social network comprises the retrieving module further configured to retrieve records and rankings of the another user from the at least one remote database; and the display module is further configured to display the records and rankings, and the separation degree of the another user on the client computing device, and the athletic profile of the another user and a connection starting date on the client computing device if the separation degree of the another user is 1, wherein the records of the another user comprises at least one of: a summary data of the another user over a pre-defined time period; and data, including win(s)-loss(es) and scores over the pre-defined time period of the second user against each opponent user.

In accordance with some embodiments, a system of quantifying and qualifying athletic skills and competitive data in a social network further comprises a group managing module configured to create a plurality of groups from the connection list of the first user based on respective attributes defined by the first user, and to enable information sharing within a respective group, wherein the information includes at least one of member information of the respective group, pictures, competition data, announcements, events, and discussion.

In accordance with some embodiments, a system of quantifying and qualifying athletic skills and competitive data in a social network further comprises an aggregation module configured to retrieve at least one of skills data, ratings data and competition data of the first user from at least one skills, ratings and competition data source on a remote database, and aggregate and store the at least one of skills and competition data of the first user from the at least one competition data source into at least one database on the system.

In accordance with some embodiments, a method of quantifying and qualifying skills and competitive data in a social network implemented on a client computing device having one or more processors and memory for storing one or more programs to be executed by the processors comprising registering a first user with the social network and creating a first user account; establishing a user profile for the first user; searching at least one remote database for at least one of skills data, ratings data and competition data relating to the first user, and if found, retrieving the at least one of skills data, ratings data and competition data and storing the data in the first user account; displaying predetermined information from the first user account on the client computing device; and creating a connection list for the first user that comprises at least one other user.

In accordance with some embodiments, a system of quantifying and qualifying skills and competitive data in a social network comprises a client computing device having one or more processors; memory for storing one or more programs to be executed by the processors; a profile managing module configured to establish and maintain a profile for a first user in at least one database; a search module configured to search the system's database for skills and competition data relating to the first user, other users, opponents and potential opponents; a communication module configured to send/receive messages to/from another user; a connections managing module configured to send/receive connection requests to/from another user; a graph managing module configured to manage a connection list of the first user, the interconnections between users, opponents and/or potential opponents, and add the another user into the connection list upon approval; a retrieving module configured to retrieve at least one of the skills and competition data of the first user from the at least one remote database and store in the first user account; a display module configured to display the at least one of the skills and competition data of the first user on the client computing device; an input module configured to input competition data, including win(s)-loss(es) and scores for a competition of the first user against an opponent user; a transmitting module configured to transmit the data, including win(s)-loss(es) and scores of the first user from the at least one remote database to update at least one of skills, ratings and competition data of the first user; and an updates module configured to update the athletic skills and competition data from at least one remote database on regular intervals and at time of login to the system.

In accordance with some embodiments, a system of quantifying and qualifying athletic skills and competition data in a social network further comprises a group managing module configured to aggregate users into a group to enable a group administrator and/or group members to analyze skills, ratings and/or competition data of group members in relation to one another with respect to the members of a particular cohort or group.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings:

FIG. 2A illustrates an exemplary embodiment of the graphical user interface home page in accordance with the present invention;

FIG. 2B illustrates an exemplary embodiment of a user registration and profile graphical user interface in accordance with the present invention;

FIGS. 5A-5D illustrate another exemplary embodiment of competition data including records and rankings organized by opponent graphical user interface of a registered user in accordance with the present invention;

FIG. 5E illustrate another exemplary embodiment of competition data including records and rankings organized by date graphical user interface of a registered user in accordance with the present invention;

FIG. 6A illustrates an exemplary embodiment of a search query result for an athlete in accordance with the present invention;

FIG. 6B illustrates another exemplary embodiment of a search query result for an athlete in various divisions, demographic groups, and/or geographic areas in accordance with the present invention;

FIG. 6C illustrates another exemplary embodiment of a search query result for a athlete in a particular geographic area in accordance with the present invention;

FIG. 7 illustrates an exemplary embodiment of a group overview graphical user interface in accordance with the present invention;

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of system of quantifying and qualifying skills and competitive results in a social network.

Figure 1:
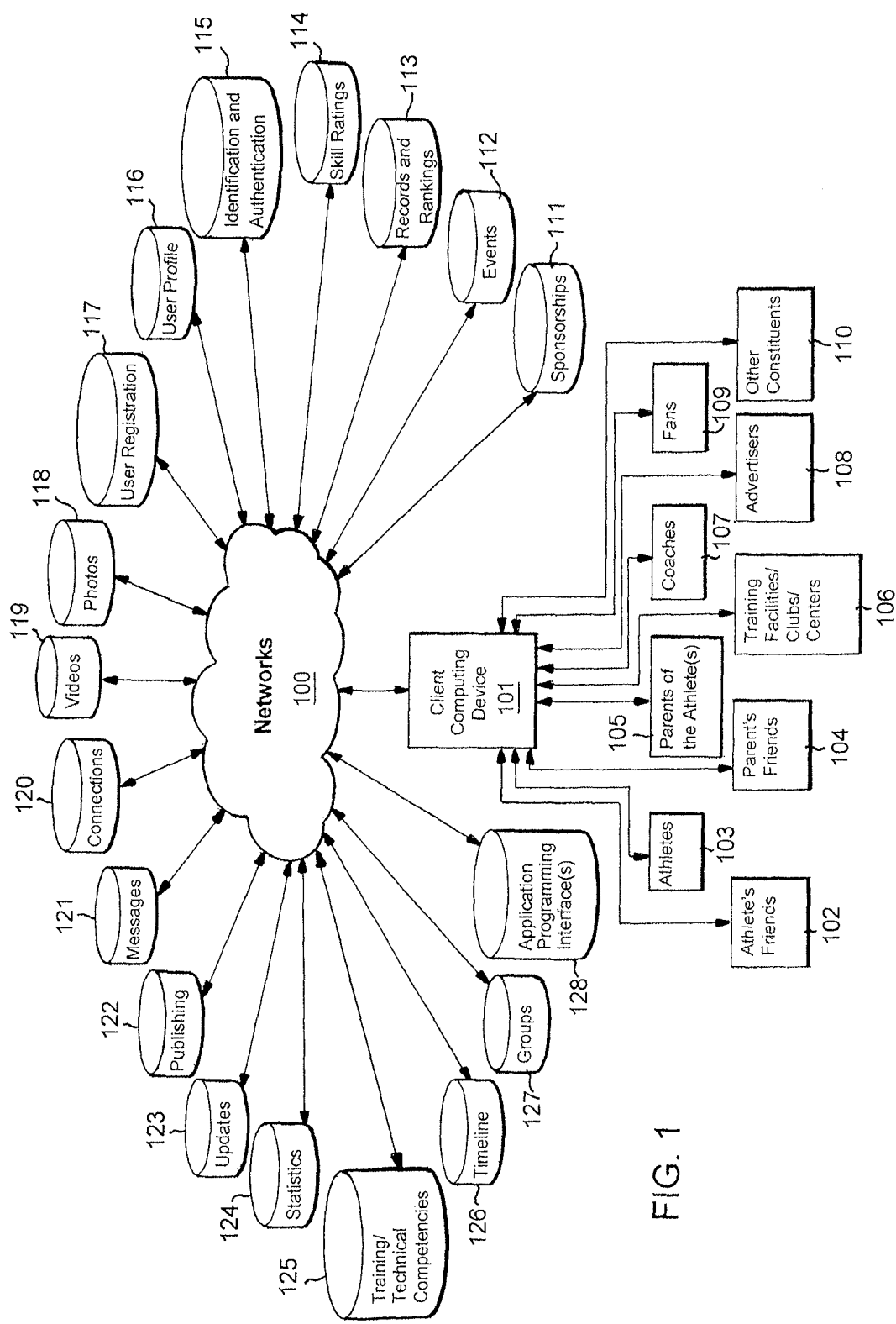
FIG. 1 illustrates an exemplary embodiment of a social networking system of quantifying and qualifying athletic skills and competitive results in a social network in accordance with the present invention.

FIG. 1 illustrates an exemplary embodiment of a system of quantifying and qualifying athletic skills and competitive results in a social network in accordance with the present invention. The system of quantifying and qualifying athletic skills and competitive results in a social network may comprise a client computing device 101, networks 100 through which the user of the client computing device can access information on remote databases of the system. The networks 100 may be any type of communication networks. The user of the client computing device 101 may include athletes 103, athlete's friends 102, parent's friends 104, parents of the athletes 105, training facilities/clubs/centers 106, coaches 107, advertisers 108, fans 109, and other constituents 110.

The user of the client computing device may access information stored and maintained in at least one database of the system, for example, sponsorships data 111, events data 112, records and rankings competition data 113, skill ratings data 114, identification and authentication data 115, user profile data 116, user registration data 117, photos 118, videos 119, connections 120, messages 121, publishing 122, updates 123, statistics 124, training/technical competencies 125, timeline 126, groups 127, and application programming interfaces 128. The information retrieved from the databases of the system is displayed on the client computing device 101. In addition to the information in the databases of the system, i.e., a private resource within the social network, the users may also access information in other competition data sources directly via networks 100, for example, information provided on the USTA website for tennis players. Therefore, in some embodiments, the information displayed on the client computing device 101 may have aggregated the competition data including records and rankings retrieved from other competition data results sources.

FIG. 2A illustrates an exemplary embodiment of the graphical user interface home page in accordance with the present invention. From the user interface, a user may input information including player's first and last names, USTA membership number, Email address, password, password confirmation to sign up with the social network of tennis athletes. Further, if the user has already signed up with the social network of tennis athletes, he/she may sign in using the email and password for identification and authentication that was previously used to register for the inventive system.

FIG. 2B illustrates an exemplary embodiment of a user profile registration in accordance with the present invention. For a first time user of the system, a user registration and profile 200 may provide a plurality of fields for the first time user to complete: a first name 201, a last name 202, gender 203, email address 204, password 205, password reentry 206, profile photo 207, street #208, street address 209, city 210, state 211, zip code 212, organization membership #213, USTA section 214, USTA district 215, rating 216, birthday 217, school 218, grade level 219, college preferences 220, organizational networks 221, training facility/club/center 222, organizational clubs 223, coaches 224, sponsorship 225, favorite players 226, player preferences 227, left handed/right handed option 228, player contact information 229, parent contact information 230, etc. The search flexibility of the present invention can improve the search efficiency and provides the user more accurate and complete data. The organizational networks 221 and the organizational clubs 223 fields may provide a list of networks and clubs for the user to choose from, and an option for the user to input an unlisted network and club. The parent contact information 230 field is provided to facilitate the management of a junior player's account. In the field of player preferences 227, a tennis player may list the racquet, shoes, clothing, string, etc., that he/she currently uses for the purpose of sponsorships or potential sponsorships. Once registered, the system creates unique authentication credentials which will enable the user to login to the social network on subsequent visits. The unique authentication credentials may be the user's name, nickname, identification number, or another unique personally identifying designation.

Figure 3:
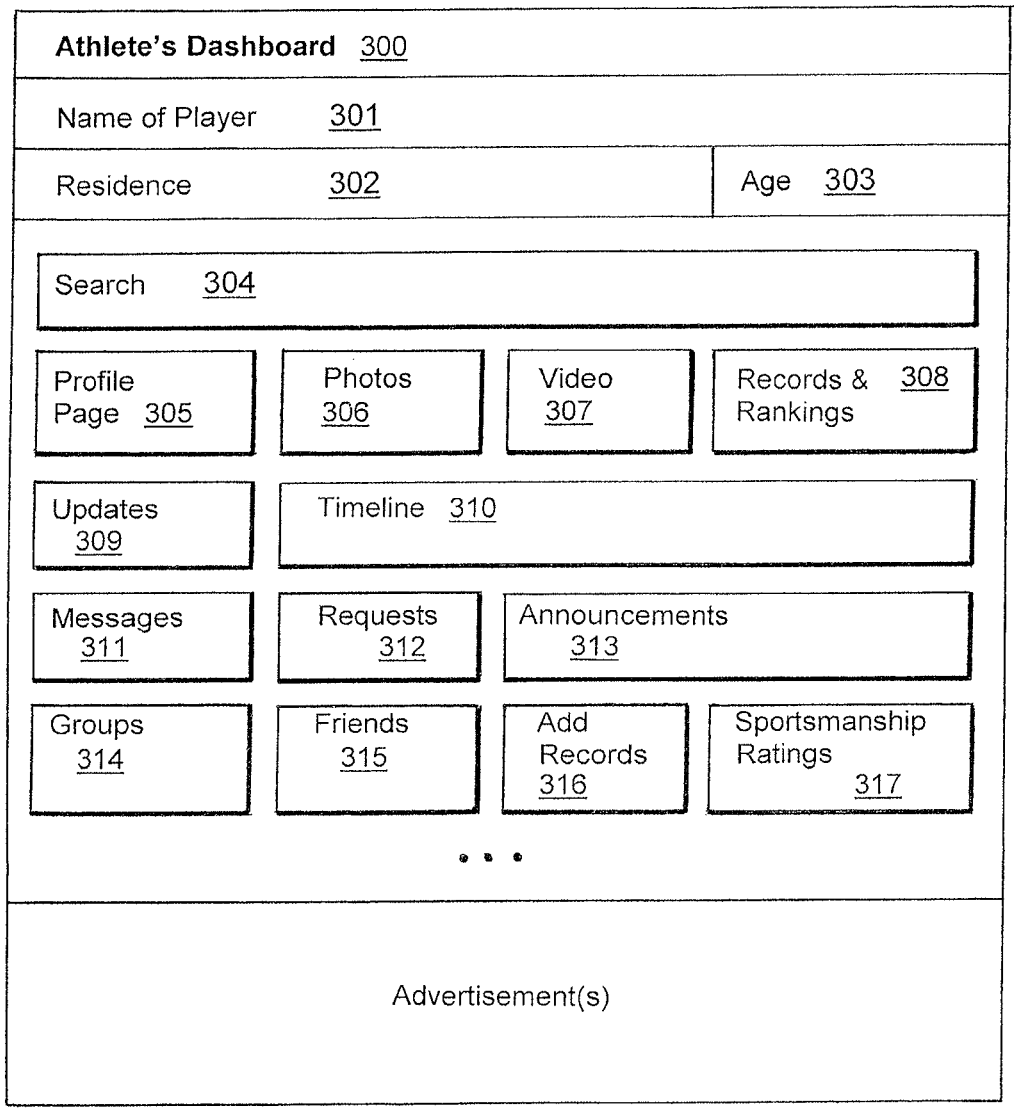
FIG. 3 illustrates an exemplary embodiment of a graphical user interface after the registered user logs into the system in accordance with the present invention.

FIG. 3 illustrates an exemplary embodiment of a user interface after the registered user logs into the system in accordance with the present invention. After the registered user logs into the system, the user interface may display an athlete's dashboard including name of the player 301, residence of the player 302, age of the player 303, a profile page 305, a photo of the player 306, video 307, records and ranking 308, updates 309, timeline 310, messages 311, requests 312, announcement 313, groups 314, friends 315, add records 316, and sportsmanship ratings 317. The user interface may further provide a search box 304 to search for a player. The profile page 305 may include the information that the player completes in FIG. 2B. The player may add, delete, describe or update personal photos. Messages 311 may include private communication messages that are sent to the player. Requests 312 may include outgoing connection requests from the player, and incoming connection requests from other players. Announcements 313 may include updates and announcements from people in the connection list of the player, such as competition data including win(s)-loss(es), scores and records of a competition that the player's connection(s) completes, events that the player is going to participate in, personal profile and/or photo update, etc. Groups 314 may include groups of the player that are created by the player based on respective attributes defined by the player. Friends 315 may include contacts that are added into the connection list via connection requests. Add Records 316 may provide the users an opportunity to add competition data including win(s)-loss (es) and scores after each competition manually.

Figure 4:
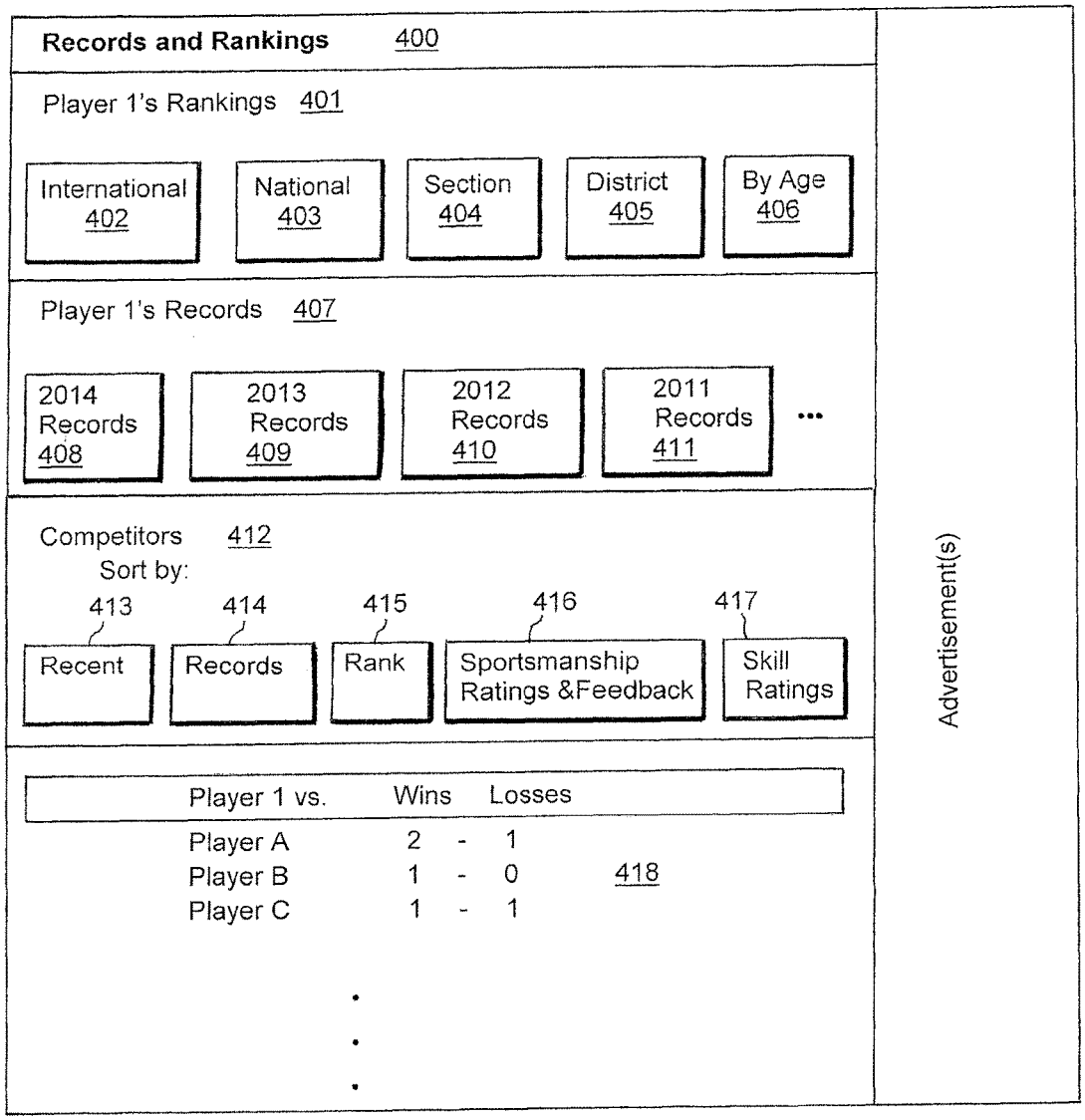
FIG. 4 illustrates an exemplary embodiment of competition data including records and rankings overview graphical user interface of a registered user in accordance with the present invention.

FIG. 4 illustrates an exemplary embodiment of records and rankings of a registered user in accordance with the present invention. Clicking the records and ranking 308 of FIG. 3 will display the records and ranking data of the athlete retrieved from the remote database on the client computing device, as illustrated in FIG. 4. The records and rankings 400 may comprise rankings data 401, records data 407, and competitor's data 412. The ranking data 401 may include a plurality of rankings of the athlete across various divisions, demographic groups, geographic sections/districts, for example, an international ranking 402, a national ranking 403, a section (i.e., region) ranking 404, and a district (i.e., local) ranking 405, etc. The player's rankings may also be sorted by the age group 406. The records data 407 may show a records summary of the athlete over a pre-defined time period, for example, the records in the past few years: 2014 records 408, 2013 records 409, 2012 records 410, and 2011 records 411, etc. The competitors' data 412 may show a results, including win(s)-loss(es) and summary for the athlete against each competitor. The results, including win(s)-loss(es) and summary may be sorted by five fields: recent 413, records 414, rank 415, sportsmanship ratings and feedback 416, and skill ratings 417. The competition data including records and rankings 400 may provide an overview of the athlete's competition levels across various divisions, demographic groups and/or geographic areas and the progress of the athlete over the past few years, and in addition, a detailed win(s)-loss(es) records for player 1 vs. various opponents 418. The skill ratings 417 may provide an overview of the skill level or rating (i.e., beginner, intermediate, advanced, etc.) and/or technical competency(ies) (i.e., split step, green dot ball—continental grip volley, cross court forehand).

FIGS. 5A-5D illustrate another exemplary embodiment of competition data including records and rankings organized by opponent of the graphical user interface of a registered user in accordance with the present invention. The records that are retrieved and displayed for a player are not limited to the examples shown in those figures. Additionally, the records of opponent athletes may not be limited to just those of registered users.

FIG. 5E illustrates another exemplary embodiment of records and rankings organized by date of the graphical user interface of a registered user in accordance with the present invention. The records that are retrieved and displayed for a player are not limited to the examples shown in those figures. Additionally, the records of opponent athletes may not be limited to just those of registered users.

For each competition between the athlete and an opponent athlete, the system may provide detailed records 500, as illustrated in FIG. 5A. The detailed records may be sorted by date 501, tournament 502, and opponent 503 as shown in FIG. 5A. The detailed records 500 may comprise a detailed result 504, including win(s)-loss(es) and scores 505 of the competition between player 1 and player A in tournament name (link) 506, tournament ID #507, tournament level 508, round 509, result/code 510, and draw 511; and a detailed result 512 in another tournament, including win(s)-loss(es) and scores 513 of the competition between player 1 and player A in tournament name (link) 513A, tournament ID #514, tournament level 515, round 516, result/code 517, and draw 518.

FIG. 5B shows the competition data records for player 1 vs. player B and player C, respectively. The records of player 1 vs. player B 519 includes win(s)-loss(es) 520, tournament name (link) 521, tournament ID #522, tournament level 523, round 524, result/code 525, and draw 526; and the records of player 1 vs. player C 527 includes win(s)-loss(es) 528, tournament name (link) 529, tournament ID #530, tournament level 531, round 532, result/code 533, and draw 534.

FIG. 5C further shows the competition data records for player 1 vs. player C in two different tournaments. The records of player 1 vs. player C 535 includes win(s)-loss(es) 536, tournament name (link) 537, tournament ID #538, tournament level 539, round 540, result/code 541, and draw 541A; and the records of player 1 vs. player C 542 includes win(s)-loss(es) 543, tournament name (link) 544, tournament ID #545, tournament level 546, round 547, result/code 547A, and draw 549.

FIG. 5D further shows the competition data records for player 1 vs. player D in two different tournaments. The records of player 1 vs. player D 550 includes win(s)-loss(es) 551, tournament name (link) 552, tournament ID #553, tournament level 554, round 555, result/code 556, and draw 557; and the records of player 1 vs. player C 558 includes win(s)-loss(es) 559, tournament name (link) 560, tournament ID #561, tournament level 562, round 563, result/code 564, and draw 565.

FIG. 5E illustrates an example of search competition data from tournament results by date. In addition to the flexibility of searching and sorting by date 556, tournament 557, opponent 558, the records may be further searched by scores 559, age groups 560, and level 561. A player record 562 may include the player's name 563, date rage 564, overall record 565, residence of the player 566, and a plurality of competition results 567, 568, 569, 570 sort by date. For example, the player record 562 shows the competition results for Smith, Jane, a junior girl residing in Philadelphia, Pa., over a period of time.

As illustrated in FIG. 4 and FIGS. 5A-5E, the present invention not only provides the athletic skills and competitive results as aggregated from various competition data results sources, i.e., public organizational databases, but also integrates the player's self-recorded competition data together with the other competition data results sources. In addition, as the self-recorded data is inputted into the system manually by the player (or the player's parents and/or coaches, etc.) after each competition, the self-recorded competition data as well as the aggregated data is updated instantly and integrated the system database. Therefore, while presented with the integrated and up-to-date information of the player in various divisions and/or geographic areas and over a time period, the player (and the player's parents and/or coaches, etc.) may have a clear and complete image of the player's up-to-date athletic skills and competitive results.

FIG. 6A illustrates an exemplary embodiment of a search result for a player in accordance with the present invention. The result shows the name of the searched player A 600, a photo of player A 601, records and ranking of player A 602, competition data records over a time period between player A and the user 609, records over a time period between player A and the user's friends, i.e., connections 610, and records over a time period between player A and people with whom the user has played 611. In some embodiments, the results may further show the profile of player A 603 and a connection status 604. If player A is in the connection list of the user, the search result shows the profile of player A and a connection starting date. If player A is not in the connection list of the user, the full profile of player A may or may not be shown, depending, for example, on user privacy settings, and instead, a separation degree of player A from the user 605 is displayed. The separation degree of player A to the current user is defined as "if there are n players through whom the user connects to player A, the separation degree of player A from the user is labeled as n+1." For example, if player A has never competed against player C, but player B has played both player A and player C, the degree of separation between player A and player B is 1 and the degree of separation between player A and player C is 2. Similarly, if there are 2 players between the user and player A, the separation degree of player A is 3, and the connection status 604 may display as "3rd."

The present invention presents the competition data records of the searched player in a tiered connection structure. Even if player A is not a direct connection of the user, it will still allow the user to get an approximate gauge of how strong player A is based on the competition data records of player A vs. the user's connections, or the competition data records of player A vs. people with whom the user has played. In some embodiments, the results may further show a connection request 606, data sort by range option 607, data sort by ranking option 608, etc.

FIG. 6B illustrates another exemplary embodiment of a search query result for a player in various divisions and/or geographic areas in accordance with the present invention. The player ranking using the search again box 611 may include the player's name 612, district information 613, section 614, select period 615, list name 616, calculation date 617, and rank position 618. For example, FIG. 6B shows Smith, Jane ranks No. 1 in Girls 12's PPR Philadelphia District on Aug. 11, 2014, and ranks No. 2 in Girls 12 Singles+25% of Doubles on Aug. 9, 2014, etc.

FIG. 6C illustrates an exemplary embodiment of a search query result for a player in a particular geographic area in accordance with the present invention. FIG. 6C shows Girls 12's PPR Philadelphia District Ranking 619, which includes a list of eligible athletes 621 in the Girls' 12 Singles, various filter options 622 such as filtering by rank, name, district, section, date range selection 623, etc.

FIG. 7 illustrates an exemplary embodiment of a group summary interface in accordance with the present invention. Player A's group 700 may include a function box to create a group 701, a function box to search for a group 702, groups the user has created 703, and other groups that the user has joined 704. Each group includes a group logo/image 705, name of the group 706, photo(s) 707, video(s) 708, description of the group 709, administrator of the group 710, number of members 711, private or public accessibility 712, and click to join box 713. Group members may originally select from the connection list of the user based on respective attribute defined by the user. One or more connections from the connection list of the user may belong to different groups created by the user. Groups may also be formed by a third party group administrator and various users on the system may join said group as per their interests and the parameters set forth by the group administrator.

Figure 8:
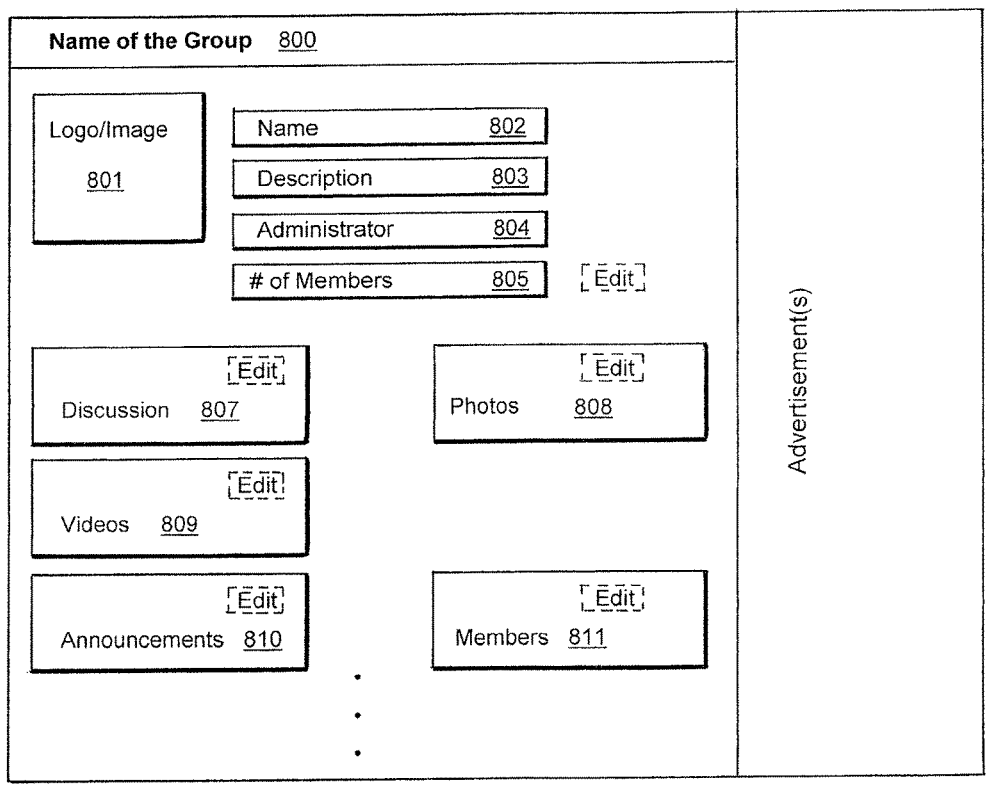
FIG. 8 illustrates an exemplary embodiment of a group managing graphical user interface in accordance with the present invention.

FIG. 8 illustrates an exemplary embodiment of a group managing interface in accordance with the present invention. The group managing interface 800 shows information shared within a respective group and includes a logo/image of the group 801, the name of the group 802, description of the group 803, administrator of the group 804, number of members 805, discussion 807, photo(s) 808, video 809, announcement 810, and members 811. For the group administrator, the group managing interface 800 may further include edit boxes in each of the group functions. The edit boxes enable the group administrator to edit all the information about the group. In some embodiments, photo(s) 808 and videos 809 shared within the group may include photos and videos of tournaments, training and camps, friends, trophies/awards, trips and experiences, famous athletes, etc. In some embodiments, the interrelationships between athletes and the sharing of information within a certain group may further provide users with various functionalities, for example, suggesting friends, notifying friends when something is posted, registering for a tournament/competition, having won an award/tournament/competition, viewing at least one of skill ratings and competition data results of the athletes by those opponents who played with them, arranging practice matches, arranging hitting sessions, assisting travelling athletes and families with tips on clubs/facilities, providing tips, reviews and resources, offering discussion forums and webinars, providing parent tips for junior athletes, sharing articles, adult leagues, match finder, hitting partners, adults rating levels, and providing notifications of new tournaments/competitions scheduled based on certain criteria in the user's profile, etc. In some embodiments, the interrelationships between athletes and the sharing of information may enabled a user, coach, or group administrator, to aggregate users into a group and to analyze at least one of the skill set and competition data results of group members in relation to one another, while only looking at members of a particular cohort or group.

Figure 9:
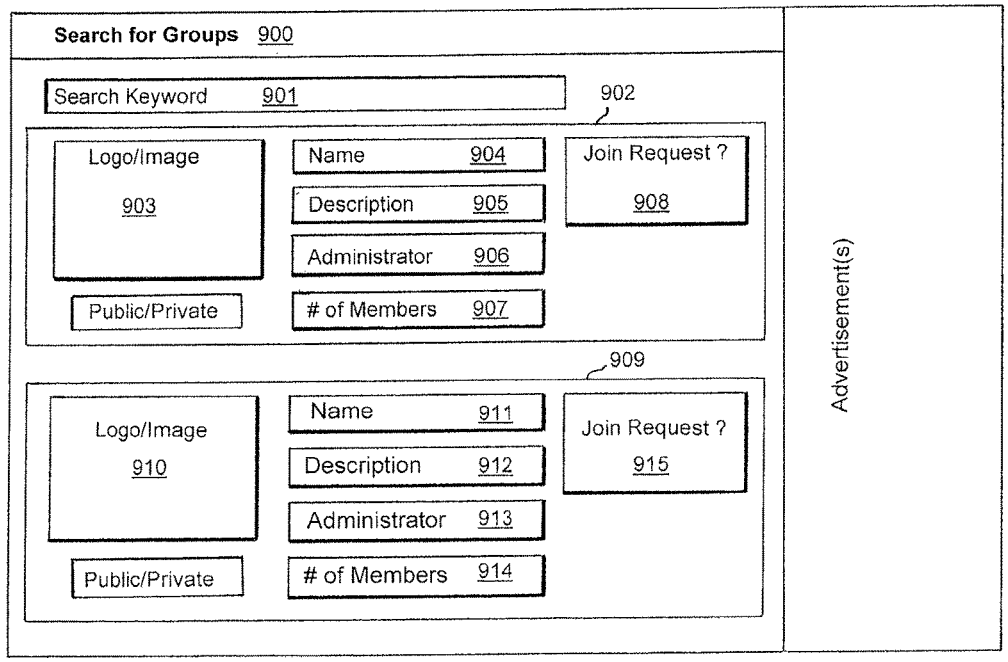
FIG. 9 illustrates an exemplary embodiment of a group search query graphical user interface in accordance with the present invention.

FIG. 9 illustrates an exemplary embodiment of a searched group interface in accordance with the present invention. The searched group interface 900 provides a search key word box 901 and displays two searched results 902 and 909 using an exemplary key word. Searched result 902 may include a logo/image of the group 903, the name of the group 904, description of the group 905, administrator of the group 906, number of members 907. If the user is interested to join the group, he/she may click the button 908 of "Join Request?" and send a request of joining the group to the administrator. Further, search result 909 may include a logo/image of the group 910, the name of the group 911, description of the group 912, administrator of the group 913, number of members 914. If the user is interested in joining the group, he/she may click the button 915 of "Join Request?" and send a request for joining the group to the administrator. The groups that are searched and the information displayed about the groups are not limited to the examples set forth above.

Figure 10:
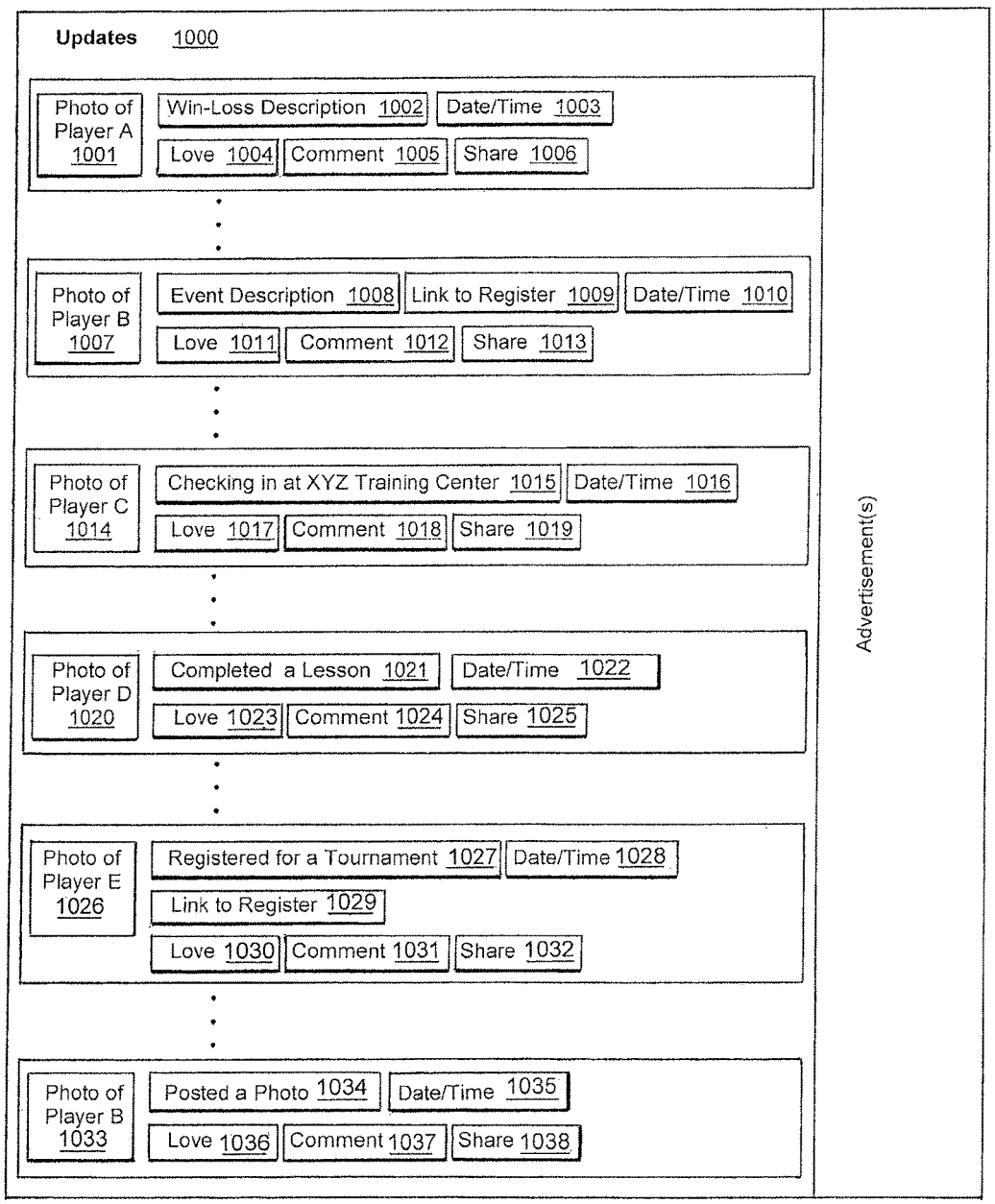
FIG. 10 illustrates an exemplary embodiment of an updates graphical user interface in accordance with the present invention.

FIG. 10 illustrates an exemplary embodiment of an updates interface in accordance with the present invention. The updates interface 1000 may illustrate the updates/announcements from the user's connections. For example, the updates interface 1000 may include a plurality of updates from players A, B, C, D, and E, respectively. The update from player A may include a photo of player A 1001, a win-loss description 1002, and date/time 1003, and further, a button to indicate a user's like or of love of the update 1004, comment 1005, and share 1006 are provided to the users who can view the update to operate. Similarly, the first update from player B may include a photo of player B 1007, an event description 1008, a link to register 1009, date/time 1010, and a button to indicate a user's like or of love of the update 1011, comment 1012, and share 1013; the update from player C may include a photo of player C 1014, a status of checking in at XYZ training center 1015, date/time 1016, and a button to indicate a user's like or of love of the update 1017, comment 1018, and share 1019; the update from player D may include a photo of player D 1020, a status of completed a lesson 1021, date/time 1022, and a button to indicate a user's like or of love of the update 1023, comment 1024, and share 1025; the update from player E may include a photo of player E 1026, a status of registered for a tournament 1027, date/time 1028, a link to register 1029, and a button to indicate a user's like or of love of the update 1030, comment 1031, and share 1032; and the second update for player B may include a photo of player B 1033, a status of posted a photo 1034, date/time 1035, and a button to indicate a user's like or of love of the update 1036, comment 1037, and share 1038, etc. In some embodiments, the player may click the love buttons to indicate his/her liking of the connection's status, post or update, write some comments by clicking the comment button, and share the status of the connection to his/her own updates.

Figure 11:
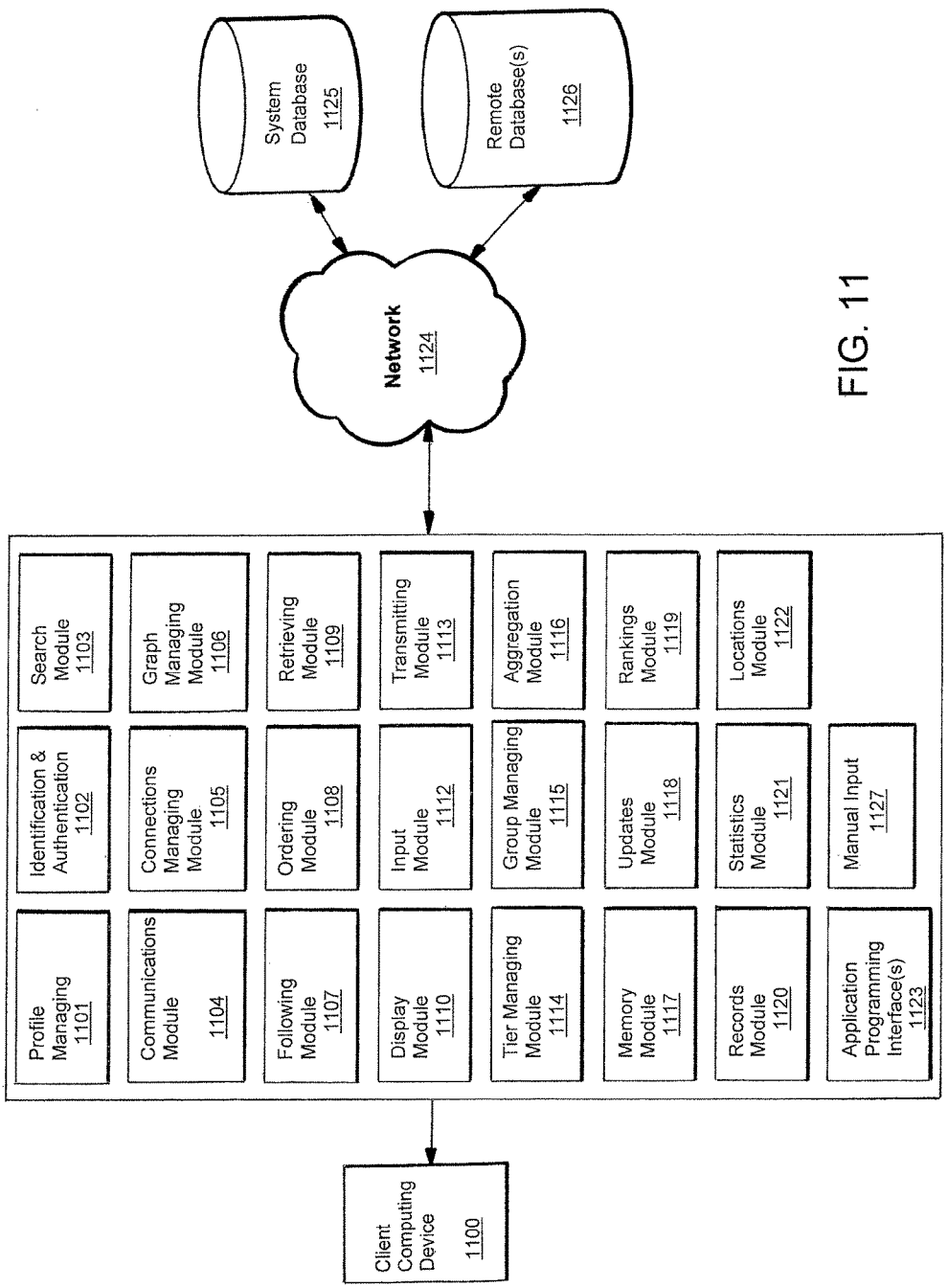
FIG. 11 illustrates another exemplary embodiment of a social networking system of quantifying and qualifying athletic skills and competitive results in a social network in accordance with the present invention.

FIG. 11 illustrates another exemplary embodiment of a system of quantifying and qualifying athletic skills and competitive results in a social network in accordance with the present invention. The system of quantifying and qualifying athletic skills and competitive results in a social network may comprise a client computing device having one or more processors 1100; a memory 1117 for storing one or more programs to be executed by the processors; a profile managing module 1101 configured to establish and maintain an athletic profile for a first player in the system's database; a search module 1103 configured to search a peer player in the system's database; a communications module 1104 configured to send/receive a connection request to/from the peer player; a contacting managing module 1105 configured to manage a connection list of the first player, and add the another player into the connection list upon approval; a retrieving module 1109 configured to retrieve competition data records and rankings of the first player from the at least one remote database; a display module 1110 configured to display the at least one of competition data including records and rankings of the first player on the client computing device; an input module 1112 configured to input competition data results, including win(s)-loss(es) and scores for a competition of the first player against an opponent player; a transmitting module 1113 configured to transmit the competition data results, including win(s)-loss(es) and scores of the first player to the remote database to update records and rankings of the first player; a network 1124; a system database containing at least one of skilled data, ratings data, and competition data results and all other data contained the social network including user inputted stats directly onto the system 1125; and at least one remote database containing at least one of competition data results, athletic skills and ratings. The competition data results source 1126 may be a public or a private organizational database, or any source that stores the competition data results, athletic skills and ratings.

In some embodiments, the system of quantifying and qualifying athletic skills and competitive results in a social network may further comprise a tier managing module 1114 configured to calculate a number of athletes through whom the first player connects to a second player, and determine a separation degree of the second player based on the calculated number of players. In some embodiments, if there are n players through whom the first player connects to the second player, through friendship and/or direct competition, the separation degree of the second player is determined as n+1. Throughout this Specification and claims, all users, competitors, opponents, potential opponents, connections and players may be classified as users or players, whether or not the user or player is a registered user of the system. The invention is not limited to any particular classification of "user." Players can be connected to other players with whom they have a mutually acknowledged connection on the social network and/or with whom they have competed.

In some embodiments, the retrieving module 1109 may be further configured to retrieve records and rankings of the second player from the remote database 1125; and the display module 1110 is further configured to display the records and rankings, and the separation degree of the second player on the client computing device 1100, and the athletic profile of the second player and a connection starting date on the client computing device if the separation degree of the second player is 1. In some embodiments, the competition data records of the second player may include a summary data of the second player over a pre-defined time period; and competition data results, including win(s)-loss(es) and scores over the pre-defined time period of the second player against each opponent player. While there may be a default time period displayed, time periods can be adjusted by the user to look at custom time periods.

In some embodiments, the system of quantifying and qualifying athletic skills and competitive results in a social network may further comprise a group managing module 1115 configured to create a plurality of groups from the connection list of the first player based on respective attributes defined by the first player, and to enable information sharing within a respective group, wherein the information includes at least one of member information of the respective group, pictures, videos, announcements, events, and comments.

In some embodiments, the system of quantifying and qualifying athletic skills and competition results in a social network may further comprise a group managing module 1115 configured to aggregate users into a group to enable the group administrator and/or group members to analyze skills, ratings and/or competition data of group members in relation to one another with respect to the members of a particular cohort or group.

In some embodiments, the system of quantifying and qualifying athletic skills and competitive results in a social network may further comprise an aggregation module 1116 configured to retrieve records and rankings of the first player from various competition data results sources such as public organizational networks, and aggregate the records and rankings of the first player from the competition data results sources into the system's database.

In some embodiments, the system of quantifying and qualifying athletic skills and competition results in a social network may further comprise an identification and authentication module 1102 configured to identify and authenticate the user log in information; a graph managing module 1106 configured to create and manage a social sport graph between the player, the player's connections and other connections; a following module 1107 configured to track the updates/announcements from other players, an ordering module 1108, an updates module 1118 configured to publish the updates/announcements of the player, a rankings module 1119 configured to maintain the up-to-date ranking data of the player, a records module 1120 configured to maintain the up-to-date records of the player, a statistics module 1121 configured to maintain the up-to-date statistic data of the player, a locations module 1122, an application programming interface(s) 1123, and a manual input module 1127.

Figure 12:
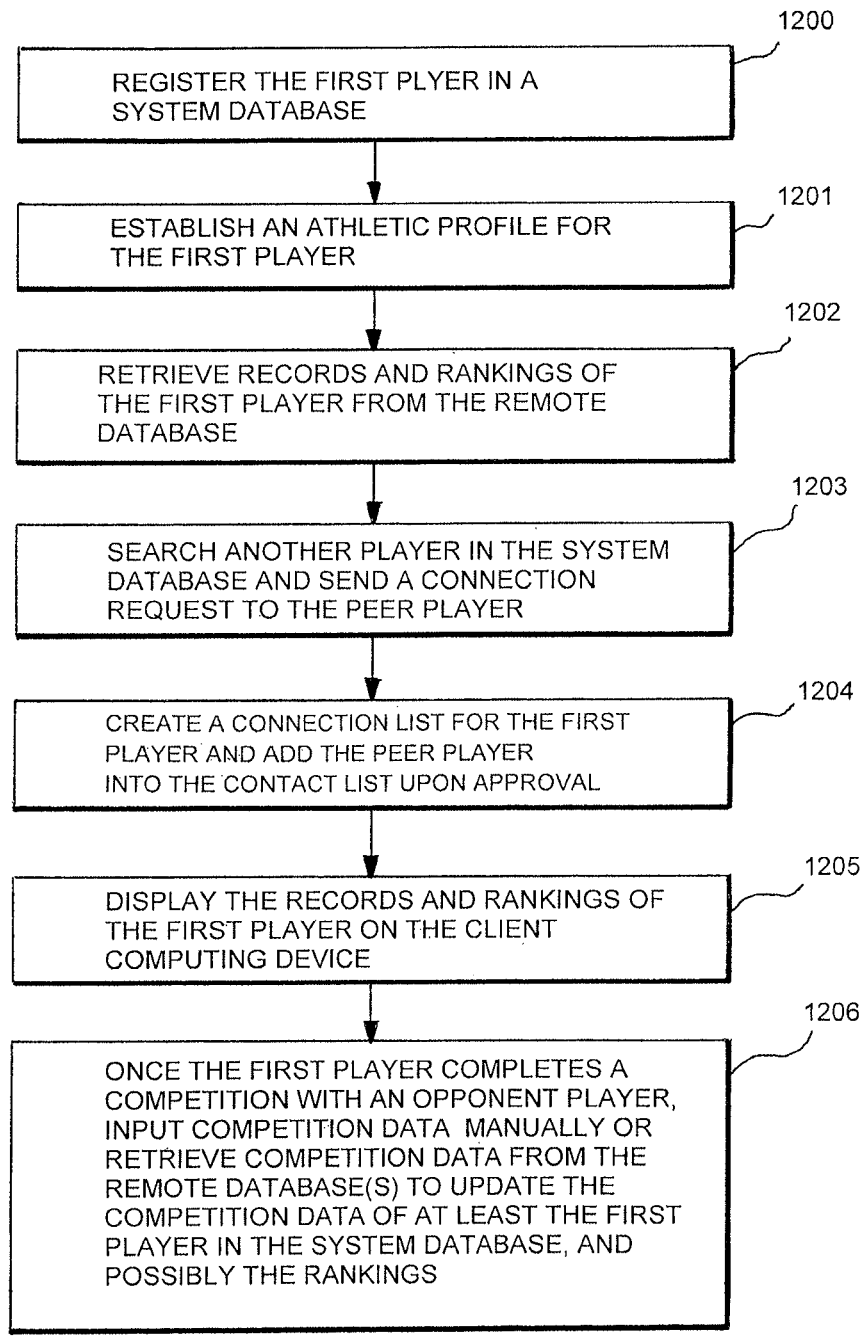
FIG. 12 illustrates an exemplary method of quantifying and qualifying athletic skills and competitive results in a social network in accordance with the present invention.

FIG. 12 illustrates an exemplary method of quantifying and qualifying athletic skills and competitive results in a social network in accordance with the present invention. The method of quantifying and qualifying athletic skills and competition results in a social network may comprise registering the first player in a remote database 1200; establishing an athletic profile for a first player 1201; retrieving competition data including records and rankings of the first player from the remote database or inputting them manually into the system's database 1202; searching a player in the system's database, and sending a connection request to the another player 1203; creating a connection list for the first player, and adding the another player into the connection list upon approval 1204; displaying the competition data records and rankings of the first player on the client computing device 1205; and once the first player completes a competition with an opponent player, inputting or retrieving competition data results, including win(s)-loss(es) and scores of the competition to update records and rankings of the first player in the system's database 1206

Figure 13:
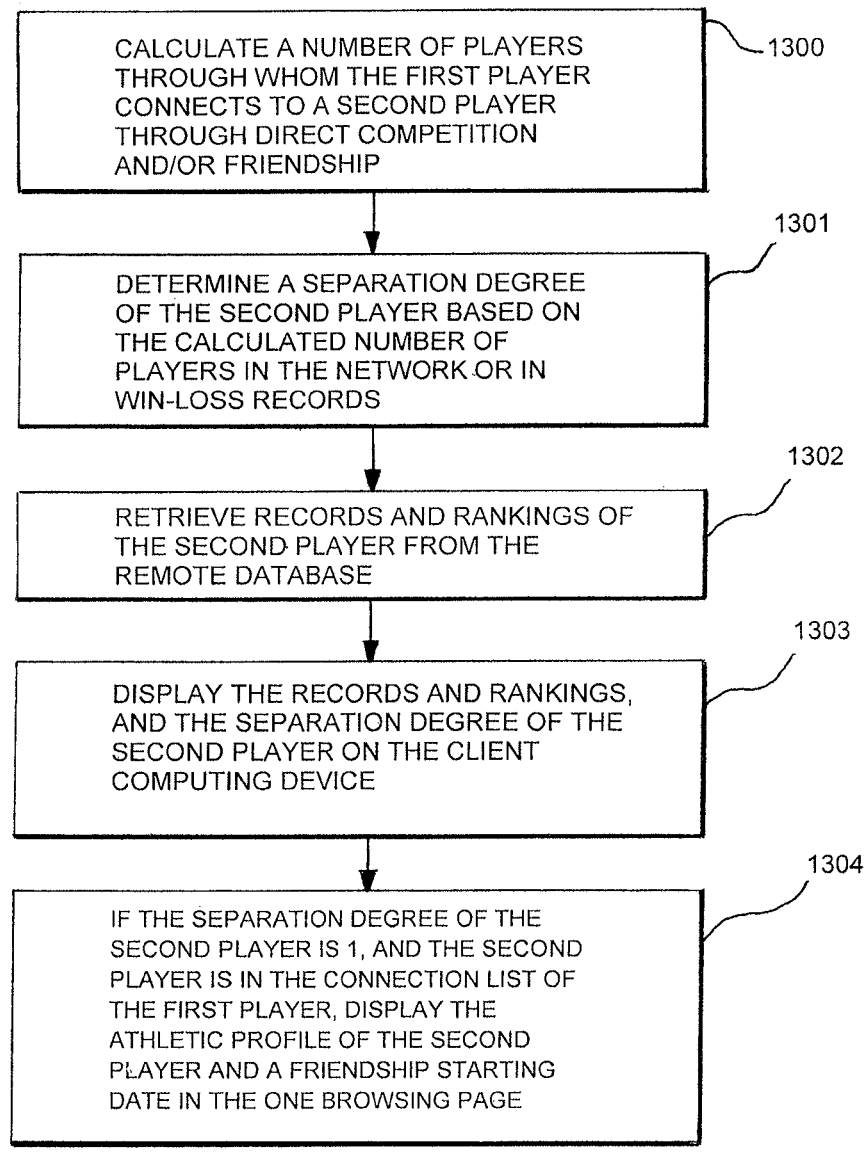
FIG. 13 illustrates another exemplary method of quantifying and qualifying athletic skills and competitive results along with degrees of separation among users and/or opponents in a social network in accordance with the present invention.

FIG. 13 illustrates another exemplary method of quantifying and qualifying athletic skills and competitive results in a social network in accordance with the present invention. The method of quantifying and qualifying athletic skills and competitive results in a social network may further comprise calculating a number of players through (with) whom the first player connects to a second player through competition and/or friendship 1300; determining a separation degree of the second player based on the calculated number of players in the network or in the win-loss records 1301; retrieving skills and competition data including records and rankings of the second player from the at least one remote database 1302; and displaying the skills and competition data records and rankings, and the separation degree of the second player on the client computing device 1303; and if the separation degree of the second player is 1, and the second player is in the connection list of the first player, displaying the athletic profile of the second player and a connection starting date on the client computing device 1304. In some embodiments, if there are n players through whom the first player connects to the second player through mutual acknowledged friendship and/or competition, the separation degree of the second player is determined as n+1.

Figure 14:
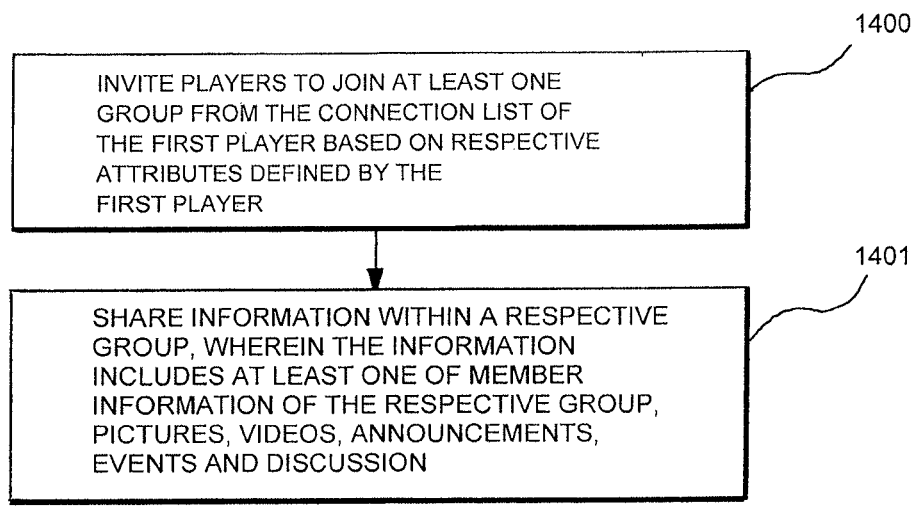
FIG. 14 illustrates yet another exemplary method of quantifying and qualifying athletic skills and competitive results in a social network in accordance with the present invention.

FIG. 14 illustrates yet another exemplary method of quantifying and qualifying athletic skills and competitive results in a social network in accordance with the present invention. The method of quantifying and qualifying athletic skills and competitive results in a social network may further comprise inviting players to join at least one group from the connection list of the first player based on respective attributes defined by the first player 1400; and sharing information within a respective group, wherein the information includes at least one of member information of the respective group, pictures, announcements, events, and discussion 1401. The method of forming groups is not just limited to the example shown in this figure whereby groups could be formed by a group administrator who is independent of the first player.

Figure 15:
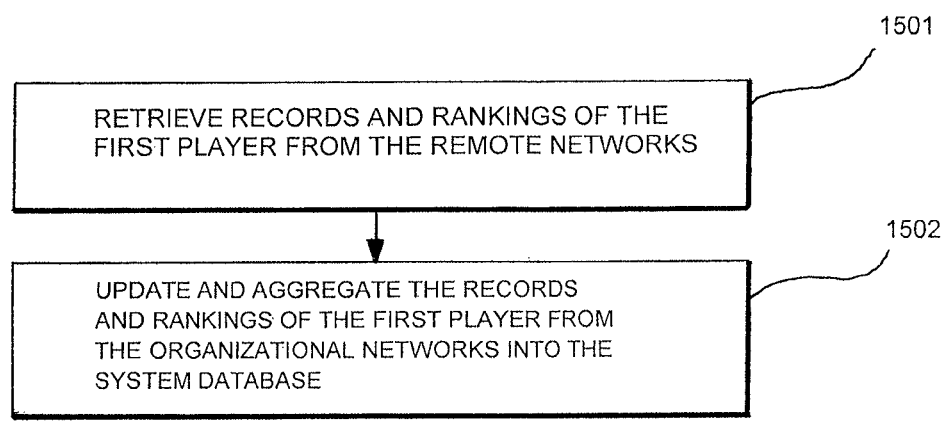
FIG. 15 illustrates yet another exemplary method of quantifying and qualifying athletic skills and competitive results in a social network in accordance with the present invention.

FIG. 15 illustrates yet another exemplary method of quantifying and qualifying athletic skills and competition results in a social network in accordance with the present invention. The method of quantifying and qualifying athletic skills and competition results in a social network may further comprise retrieving records and rankings of the first player from at least one competition data results source 1501, i.e., a public or private organizational database or any source that stores the competition data results, and updating and aggregating the records and rankings of the first player into the system database 1502.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A method of quantifying and qualifying athletic skills and competitive data in a social network implemented on a client computing device having one or more processors and memory for storing one or more programs to be executed by the processors comprising:

registering a first user with the social network and creating a first user account;

establishing a user profile for the first user;

searching at least one remote database for at least one of skills data, ratings data and competition data relating to the first user and retrieving the at least one of skills data, ratings data and competition data and adding the data to the first user account in a social network database;

displaying predetermined information from the first user account on the client computing device;

creating a connection list for the first user that comprises at least one other user;
calculating a number of users through whom the first user connects to another user; and
determining a separation degree of the another user based on the calculated number of users,
wherein if there are n users through whom the first user connects to the another user, the separation degree of the another user is determined as n+1;
retrieving at least one of skills data, ratings data, and competition data of the another user from the at least one remote database;
displaying the at least one of skills data, ratings data, and competition data, and the separation degree between the user and the another user on the client computing device; and
displaying predetermined information from the another user account or the remote database and a connection starting date on the client computing device based on the separation degree between the user and the another user,
wherein the predetermined information from the another user comprises at least one of:
a summary of competition data of the another user over a pre-defined time period; and
competition data over a pre-defined time period of the another user against each opponent.

2. The method of quantifying and qualifying athletic skills and competitive data in a social network according to claim 1, wherein the connection list is created by at least one of:
the first user directly sending a connection request to at least one other user and receiving an acceptance from the at least one other user;
the first user searching the social network database and sending a connection request to at least one other user found in the search results and receiving an acceptance from the at least one other user;
the first user searching the at least one remote database and sending a connection request to at least one other user found in the search of the remote database and receiving an acceptance from the at least one other user;
the first user accepting a connection request from at least one other user; and
the first user directly competing against at least one other user.

3. The method of quantifying and qualifying athletic skills and competitive data in a social network according to claim 1, further comprising updating at least one of the skills data, ratings data and competition data of the first user after the first user completes a competition or training for which there is at least one updated skills, ratings and/or competition data available in at least one remote database.

4. The method of quantifying and qualifying athletic skills and competitive data in a social network according to claim 1, wherein searching at least one remote database for at least one of skills data, ratings data and competition data relating to the first user and retrieving the at least one skills data, ratings data and competition data and adding the data to the first user account is performed by the first user.

5. The method of quantifying and qualifying athletic skills and competitive data in a social network according to claim 1, further comprising:
creating a plurality of groups from the connection list of the first user based on attributes defined by the first user.

6. The method of quantifying and qualifying athletic skills and competitive data in a social network according to claim 1, further comprising creating at least one group to aggregate users into a group wherein the group administrator and/or group members can analyze skills, ratings and/or competition data of group members in relation to one another with respect to the members of a particular cohort or group.

7. The method of quantifying and qualifying athletic skills and competitive data in a social network according to claim 1, further comprising:
retrieving at least one of skills, ratings and competition data of the first user from at least one of skills, ratings and competition data source, and
aggregating the at least one of skills, ratings and competition data of the first user from the at least one remote competition data source and storing in the first user account in the social network database.

8. The method of quantifying and qualifying athletic skills and competitive data in a social network according to claim 1, wherein the user profile of the first user comprises at least one of:
a photo of the first user;
personal information of the first user including a unique personally identifying data;
athletic information of the first user including an organizational ID number;
contact information;
date of birth;
sport(s) played;
college recruiting data;
coaches of the first user;
academic schools attended;
tennis camps attended;
tennis facilities where user trains;
teams competed on/doubles partners;
sponsorships of the first user; and
parent information of the first user.

9. The method of quantifying and qualifying athletic skills and competitive data in a social network according to claim 8, wherein at least one of the skills data, ratings data and competition data of the first user is retrieved by the system using the unique personally identifiable data of the first user, and storing same in the system database.

10. The method of quantifying and qualifying athletic skills and competitive data in a social network according to claim 1, wherein the at least one of the skills data, ratings data and competition data of the first user may include a plurality of rankings and records data across various divisions, demographic groups and/or geographic areas.

11. The method of quantifying and qualifying athletic skills and competitive data in a social network according to claim 1, wherein the at least one of the skills data, ratings data and competition data of the first user comprises:
a competition summary data of the first user over a pre-defined time period;
competition data, including win(s)-loss(es) and scores for each competition of the first user against each opponent; and
date and location of each competition.

12. A system of quantifying and qualifying athletic skills and competitive data in a social network comprising:
a client computing device having one or more processors;
memory for storing one or more programs to be executed by the processors;
a profile managing module configured to establish and maintain a user profile for a first user in at least one database;

a search module configured to search the system's database for skills data, ratings data and competition data relating to the first user, other users, opponents and/or potential opponents;

a communication module configured to send/receive messages to/from another user;

a connections managing module configured to send/receive connection requests to/from another user;

a graph managing module configured to manage a connection list of the first user, the interconnections between users, opponents and potential opponents, and add other users, opponents and potential opponents into the connection list upon approval;

a retrieving module configured to retrieve skills, ratings and competition data of the first user from the at least one database;

a display module configured to display the at least one of skills, ratings, and competition data of the first user on the client computing device;

an input module configured to input competition data, including win(s)-loss(es) and scores for a competition of the first user against an opponent and/or another user;

a transmitting module configured to transmit the competition data, including win(s)-loss(es) and scores of the first user from the at least one database to update at least one of athletic skills, ratings and competition data of the first user in the profile managing module; and an updates module configured to update the at least one of athletic skills data, ratings data and competition data from at least one remote database on a regular interval and at time of login to the system;

a tier managing module configured to:
calculate a number of users through whom the first user connects to another user; and
determine a separation degree of the another user based on the calculated number of users,
wherein, if there are n users through whom the first user connects to the another user, the separation degree of the another is determined as n+1, wherein the retrieving module is further configured to retrieve at least one of skills data, ratings data, and competition data of the another user from the at least one remote database, wherein the display module is further configured to display the at least one of skills data, ratings data, and competition data, and the separation degree between the user and the another user on the client computing device, wherein the display module is further configured to display predetermined information from the another user account or the remote database and a connection starting date on the client computing device based on the separation degree between the user and the another user, wherein the records of the another user comprises at least one of:
a summary data of the another user over a pre-defined time period; and
data, including win(s)-loss(es) and scores over the pre-defined time period of the second user against each opponent user.

13. The system of quantifying and qualifying athletic skills and competitive data in a social network according to claim 12, wherein:
the display module is further configured to display the records and rankings, and the separation degree of the another user on the client computing device, and the athletic profile of the another user and a connection starting date on the client computing device based on the separation degree of the another user; and
the records of the another user comprises data, including win(s)-loss(es) and scores over the pre-defined time period of the second user against each opponent user.

14. The system of quantifying and qualifying athletic skills and competitive data in a social network according to claim 12, further comprising:
a group managing module configured to create a plurality of groups from the connection list of the first user based on respective attributes defined by the first user, and to enable information sharing within a respective group, wherein the information includes at least one of member information of the respective group, pictures, competition data, announcements, events, and discussion.

15. The system of quantifying and qualifying athletic skills and competitive data in a social network according to claim 12, further comprising:
an aggregation module configured to retrieve at least one of skills data, ratings data and competition data of the first user from at least one skills, ratings and competition data source on a remote database, and aggregate and store the at least one of skills and competition data of the first user from the at least one competition data source into at least one database on the system.

16. The system of quantifying and qualifying athletic skills and competition data in a social network according to claim 12, further comprising a group managing module configured to aggregate users into a group to enable a group administrator and/or group members to analyze skills, ratings and/or competition data of group members in relation to one another with respect to the members of a particular cohort or group.

17. A method of quantifying and qualifying skills and competitive data in a social network implemented on a client computing device having one or more processors and memory for storing one or more programs to be executed by the processors comprising:
registering a first user with the social network and creating a first user account;
establishing a user profile for the first user;
searching at least one remote database for at least one of skills data, ratings data and competition data relating to the first user and retrieving the at least one of skills data, ratings data and competition data and storing the data in the first user account;
displaying predetermined information from the first user account on the client computing device; and
creating a connection list for the first user that comprises at least one other user;
calculating a number of users through whom the first user connects to another user; and
determining a separation degree of the another user based on the calculated number of users,
wherein, if there are n users through whom the first user connects to the another user, the separation degree of the another user is determined as n+1;
retrieving at least one of skills data, ratings data, and competition data of the another user from the at least one remote database;
displaying the at least one of skills data, ratings data, and competition data, and the separation degree between the user and the another user on the client computing device; and displaying predetermined information from the another user account or the remote database and a connection starting date on the client computing device based on the separation degree between the user and the another user, wherein the predetermined information from the another user comprises at least one of:
- a summary of competition data of the another user over a pre-defined time period; and
- competition data over a pre-defined time period of the another user against each opponent.

18. A system of quantifying and qualifying skills and competitive data in a social network comprising:
- a client computing device having one or more processors;
- memory for storing one or more programs to be executed by the processors;
- a profile managing module configured to establish and maintain a profile for a first user in at least one database;
- a search module configured to search the system's database for skills and competition data relating to the first user, other users, opponents and potential opponents;
- a communication module configured to send/receive messages to/from another user;
- a connections managing module configured to send/receive connection requests to/from another user;
- a graph managing module configured to manage a connection list of the first user, the interconnections between users, opponents and/or potential opponents, and add the another user into the connection list upon approval;
- a retrieving module configured to retrieve at least one of the skills and competition data of the first user from the at least one database and store in the first user account;
- a display module configured to display the at least one of the skills and competition data of the first user on the client computing device;
- an input module configured to input competition data, including win(s)-loss(es) and scores for a competition of the first user against an opponent user;
- a transmitting module configured to transmit the data, including win(s)-loss(es) and scores of the first user from the at least one database to update at least one of skills, ratings and competition data of the first user; and
- an updates module configured to update the athletic skills and competition data from at least one remote database on regular intervals and at time of login to the system;
- a tier managing module configured to:
  - calculate a number of users through whom the first user connects to another user; and
  - determine a separation degree of the another user based on the calculated number of users,
  - wherein, if there are n users through whom the first user connects to the another user, the separation degree of the another is determined as n+1, wherein the retrieving module is further configured to retrieve at least one of skills data, ratings data, and competition data of the another user from the at least one remote database, wherein the display module is further configured to display the at least one of skills data, ratings data, and competition data, and the separation degree between the user and the another user on the client computing device, wherein the display module is further configured to display predetermined information from the another user account or the remote database and a connection starting date on the client computing device based on the separation degree between the user and the another user, wherein the records of the another user comprises at least one of:
- a summary data of the another user over a pre-defined time period; and
- data, including win(s)-loss(es) and scores over the pre-defined time period of the second user against each opponent user.

* * * * *